United States Patent [19]
Johnson

[11] 3,935,573

[45] Jan. 27, 1976

[54] DOPPLER RADAR SENSOR CALIBRATOR

[75] Inventor: Henry Charles Johnson, Neshanic, N.J. 08853

[73] Assignee: RCA Corporation, New York, N.Y.

[22] Filed: Apr. 8, 1974

[21] Appl. No.: 458,847

[52] U.S. Cl. .............................................. 343/17.7
[51] Int. Cl.² ........................................... G01S 7/40
[58] Field of Search .................................. 343/17.7

[56] References Cited
UNITED STATES PATENTS

| | | | |
|---|---|---|---|
| 2,836,813 | 5/1958 | Flower et al. | 343/17.7 |
| 3,103,010 | 9/1963 | Heyser et al. | 343/17.7 |
| 3,277,477 | 10/1966 | Evans | 343/17.7 |
| 3,329,953 | 7/1967 | Adams et al. | 343/17.7 |
| 3,331,070 | 7/1967 | Sommers et al. | 343/17.7 |
| 3,573,826 | 4/1971 | Fredericks | 343/17.7 |

Primary Examiner—Malcolm F. Hubler
Attorney, Agent, or Firm—Edward J. Norton, Joseph D. Lazar, Michael A. Lechter

[57] ABSTRACT

An electronic calibrator for doppler radar speed sensors and odometers comprising a variable impedance device, such as a varactor, positioned in the near-field of the radar antenna to modulate the radar probe beam, in the calibrate mode of the radar at a rate corresponding to the frequency of a doppler signal that would be sensed by the radar in its operating mode at a given speed. The impedance during the calibration mode is excited by a separate a.c. signal at a frequency corresponding to the doppler signal frequency. The output of the radar provides an indication during the calibration mode that can be adjusted to a calibrated indication corresponding to the actual speed causing a doppler signal of the same frequency as the excitation signal for the impedance.

14 Claims, 1 Drawing Figure

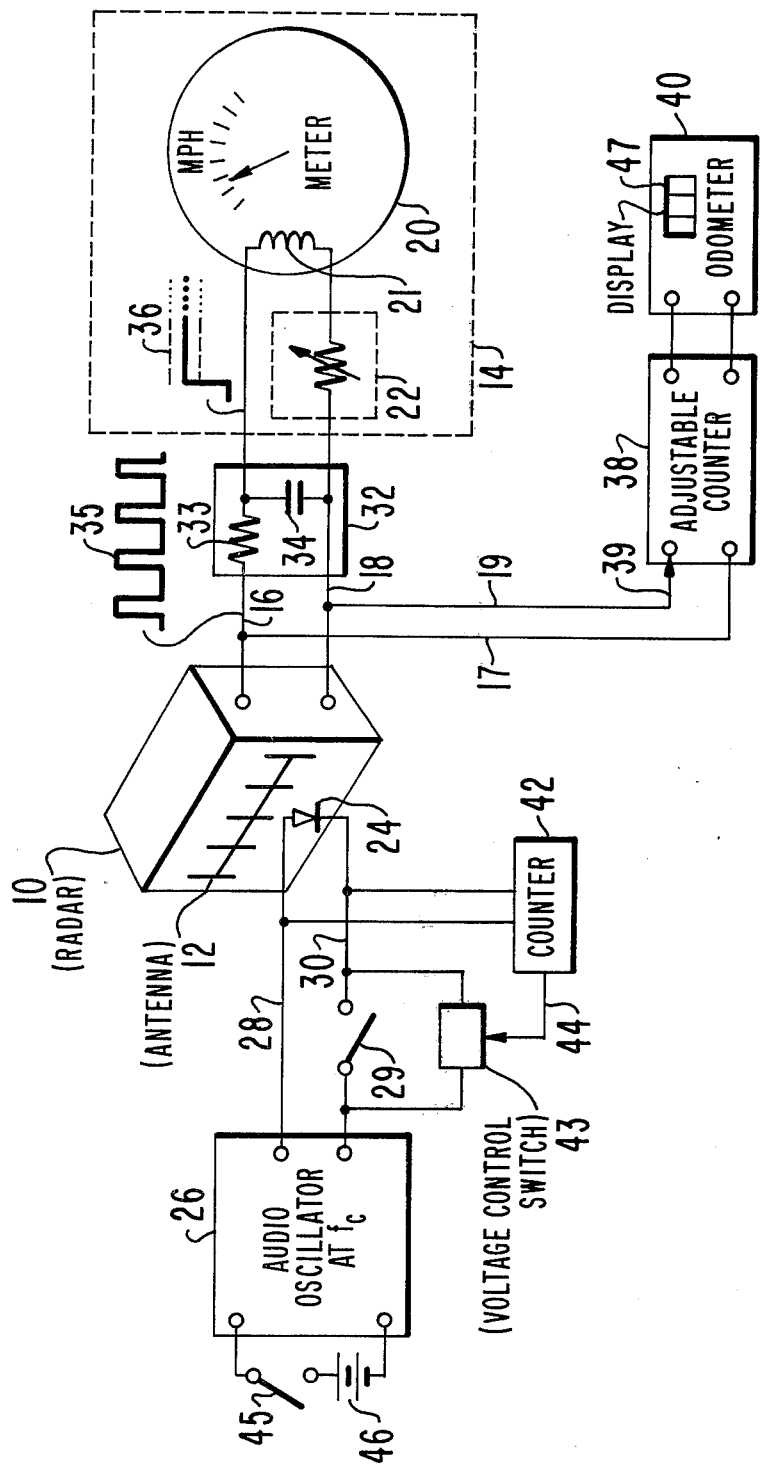

DOPPLER RADAR SENSOR CALIBRATOR

BACKGROUND OF THE INVENTION

1. Field of the Invention

The present invention relates to apparatus and a method for calibrating a doppler radar speed sensor and odometer.

2. Description of the Prior Art

Doppler radars have found extensive use by law enforcement agencies for remote sensing of vehicular speeds, and are now being developed for use as onboard ground speed sensors in locomotives, automobiles and other vehicles. One of the present methods of calibrating such speed sensors comprises striking a tuning fork of known resonant frequency, and holding the tuning fork in front of the radar antenna. The tuning fork, when vibrated, modulates a return signal to the doppler radar sensor to simulate a doppler radar return signal. The speed indicating device is adjusted to indicate the speed corresponding to the resonant frequency of the tuning fork.

Such a method, however, is disadvantageous in that the antenna must be accessible to the tuning fork. In addition, the tuning fork generates signals only for a relatively short time period after being struck and consequently the calibration of the speedometer is hurried. For example, vehicular speed sensors are typically situated on the underside of the vehicle. Consequently, to calibrate the speed read-out of the speedometer someone must crawl under the vehicle, strike the tuning fork and hold it in proximity to the speed sensor antennas while a second person adjusts the read out. The calibration adjustment is typically extremely sensitive, and may require repeated operations of the tuning fork to achieve the desired accuracy.

A second known calibration method involves calibrating the sensor with a mechanically moving reference. Such procedures, however, typically utilize apparatus which is very bulky and difficult to position near the radar antenna.

Another method of calibrating doppler radar speed sensors includes the application of a given audio signal (after suitable processing) directly to the speed indicator of the system. Such a method, however, by-passes the radar sensor portion of the system, and hence does not serve to provide a complete operational check of the entire speed sensor system.

The present invention provides a method of calibrating doppler radar speed sensors whereby a calibration signal is provided for sustained periods as required for accurate calibration of an apparatus that is easily positioned with respect to the radar antenna. Moreover, the method of the present invention provides a complete operational check on the speed sensor system.

SUMMARY OF THE INVENTION

The present invention provides for apparatus and a method for calibrating doppler radar sensors having an indicator coupled to the output of the sensor for indicating doppler signals. A radar probe signal from the radar sensor is modulated with a modulating signal having a predetermined frequency corresponding to a predetermined doppler signal output by positioning a varying impedance in the near-field of said radar probe. A doppler signal output having a frequency equal to the predetermined modulating frequency is derived from the modulated radar probe. The doppler signal output is then adjusted to provide an indication corresponding to a predetermined value. The invention is useful particularly to calibrate speed sensors and odometers.

DESCRIPTION OF THE DRAWING

The sole FIGURE of the drawing is a schematic diagram of a sensing system provided with a calibrator in accordance with a present invention.

DETAILED DESCRIPTION OF THE PREFERRED EMBODIMENT

A typical doppler radar of the type useful for the present invention comprises a radio frequency (RF) power source, an antenna network and a mixer. A beam of the RF signal is transmitted by the antenna network in a given direction toward a target. The transmitted signal is reflected from the target, doppler shifted by relative motion between target and the radar, and is received by the antenna network. The received reflection is fed to suitable subtraction means, such as a mixer, wherein the reflected signal is subtracted from a local oscillator signal thereby extracting the doppler shift frequency. The local oscillator signal may be a sample portion of the transmitted signal (homodyne), or a signal displaced by a suitable intermediate frequency.

In a doppler radar ground speed sensor the radar is mounted on a vehicle with the antenna (12) positioned so as to direct the transmitted beam in a common vertical plane with the vehicle velocity vector at a given acute angle ($\theta$) with respect to the road surface (which acts as the reflector-target). Thus, part of the transmitted signal is back-scattered (diffusely reflected) from the road surface back to the antenna network. Hence, if the vehicle is moving with velocity V with respect to the ground, the reflected signal is shifted in frequency by the doppler affect. The doppler frequency $f_D$ may be represented by:

$$f_D = \frac{2V}{\lambda} \cos \theta \qquad (1)$$

where $\lambda$ is the wavelength of the transmitted signal, V the velocity of the vehicle, $\theta$ is the angle of the beam. The doppler frequency is extracted by the aforementioned mixing (subtracting) process between the reflected signal and a local oscillator signal. For an X-band signal source, at automobile velocities in the range of 20–70 mph, the doppler frequency is in the low audio frequency range. The audio output signal of the mixer is suitably amplified, clipped and utilized to trigger a monostable multivibrator, the output pulses of which are averaged and applied to a conventional velocity readout. A more detailed description of such doppler radar speed sensors may be found in an article by H. C. Johnson and A. Presser entitled "Automotive Doppler Speed Sensor" published in the RCA Engineer, Volume 18, No. 6, April-May 1973, pages 62–65.

Referring now to the sole FIGURE Of the drawing there is illustrated a conventional doppler radar 10 having an antenna 12 and speed indicator (speedometer) 14. Pulse train 35 from the subtracting means of radar 10 is applied over conductors 16 and 18 to a pulse averager 32, suitably a series resistor 33 and shunt capacitor 34, which serves to convert pulse train 35 to an average d.c. signal 36. The averaged d.c. signal 36 is applied to the indicator 14. Speed indicator 14 comprises a conventional d.c. meter 20 and a suitable adjustment means such as a variable resistor 22. The averaged d.c. signal 36 energizes d.c. meter 20. The present invention is directed to a method of calibrating such speed sensors comprising the radar 10 and indicator 14.

In accordance with a feature of the invention means are provided for calibrating in a sensor system as described an odometer which may be in a separate independent system or integral with the speedometer system. Assuming an integral system as illustrated in the drawing, the doppler pulse train 35 generated by the radar 10 is coupled to an adjustable counter 38 over conductors 17 and 19. The output of the counter 38 is coupled to a conventional digital odometer 40 having digital visual display 47 representing distance in suitable units.

Adjustable counter 38, serves as a means to subtract counts from or add counts to doppler pulse train 35 to correct, if necessary, and thereby calibrate, the reading of odometer 40 to a predetermined value in response to the calibration process, as will be explained. Counter 38 may be formed of any suitable logic components that will add or subtract a variable preset number of counts to the doppler pulse train 35 from radar 10. For example, a conventional programmable counter provided with thumbwheel adjustments may be utilized to provide such a function.

In accordance with the present invention a variable impedance device, such as a variable capacitance varactor diode 24, is positioned in the near field of antenna 12 so as to be illuminated by a portion of the transmitted signal (and to avoid any sensitivity nulls inherent in a conventional homodyne radar). An adjustable variable frequency audio oscillator 26, when coupled to energy source 46 by switch 45, provides an a.c. signal at a preselected given frequency ($f_c$) which is applied over conductors 28 and 30, conductor 30 having a switch 29, across diode 24, thereby varying the capacitance of the diode at an audio rate in accordance with the audio frequency $f_c$ when switch 29 is closed to place the system in its speed calibration mode. The varying capacitance of the diode appears to the radar 10 as a mechanical vibration and causes thereby a portion of the transmitted beam to be phase modulated and reflected back to the radar antenna.

Reference is made to the text entitled, "Microwave Semiconductor Devices and Their Circuit Applications", by H. A. Watson, published by McGraw-Hill 1969, pp. 331–333, for a description of the phase modulation effect developed by a varactor diode, and, in relation to another embodiment of the invention, hereinafter described, to pp. 271–280 for a description of the use of P-I-N diodes for an amplitude modulation effect on a microwave signal. These modulation effects have been fully explained in other publications and are otherwise well known in the art. Accordingly, no further detailed explanation is believed required.

The phase modulation is extracted by the radar subtraction means (not shown) and therein converted to what may be termed a "pseudo-doppler" audio signal at frequency $f_c$. The pseudo-doppler audio output signal is processed and displayed as speed on meter 20. The indicated speed is corrected if necessary by means of variable resistor 22 to the speed (V) corresponding to the audio frequency $f_c$ as calculated by equation (1). In operation for speed calibration, the adjustment of variable resistor 22 varies the voltage across the coil 21 of d.c. meter 20 and thereby provides a means for calibrating the actual indication of the needle to the calculated speed (V). According to the invention, this calibration adjustment assures that the doppler sensor system is not only operating properly but is also adjusted to indicate, in the operating mode (switch 29 opened), the true speed manifested by the doppler returns.

According to the invention, a pseudo-doppler calibration signal may be also generated by means of a variable resistance device, such as a forward biased PN or P-I-N diode (24). Such a device is positioned in the near field of antenna 12. The resistance of PN diode 24 will, in response to audio signal ($f_c$) from oscillator 26, vary in accordance with the frequency $f_c$. This variation will amplitude modulate the radar signal and appear to the radar receiver as a doppler return. The amplitude modulation frequency is extracted by the radar subtraction means as known in the art and is similarly utilized to calibrate indicator 14 as described above.

For the odometer mode of operation, a bilateral or voltage controlled switch 43 is connected in parallel with switch 29. Switch 43 is actuated over control path 44 from a counter 42 connected in the circuit across conductors 28 and 30.

According to the invention for operation in the odometer calibration mode, switch 29 is open in the position shown in the drawing. Switch 43 is closed, thereby causing the oscillator to provide a signal to diode 24. Switch 43 is initially in the closed position. Counter 42, suitably, a count-down counter, is preset with a predetermined count corresponding to a desired distance to be displayed by the odometer 40. It should be appreciated and understood that the counter 42 counts the number of cycles generated by oscillator 26 which, in accordance with Equation 1, determines the velocity of the vehicle and inherently provides the factor of time required for the distance. Thus, the distance is determined by the number of cycles of oscillator 26 counted. At the end of the count by counter 42, a signal is generated over path 44 to energize switch 43 to thereby open the path 30 to de-energize diode 24.

During the period of the operation of diode 24 and counter 42, a pulse train 35 was generated at the output of radar 10, conducted through counter 38, and therefrom to odometer 40. Counter 38 is set to add or subtract a given number of "correction" pulses to pulse train 35, to develop a digital display 47 corresponding to the distance equivalent to the distance represented in the counter 42. If the indicated distance does not correspond to the specified distance, the added or subtracted correction pulses of counter 38 are adjusted accordingly. Such an adjustment assures that odometer 40 will provide an accurate display of distance in the operation mode of the system.

The calibrator according to the invention may be constructed as a separate portable battery powered unit or may be incorporated integrally into the radar. The diode 24 has no measurable affect on the radar performance when not excited by audio oscillator 26. In those radars utilizing a flat corporate network printed circuit antenna system, of the type described in U.S. Pat. No. 3,587,110, as illustrated in drawing, the diode may be mounted directly on the antenna substrate within the near-field of the antenna. In horn antenna type radars, the variable impedance device is positioned in the near field of the transmitted radar beam as previously indicated.

During the calibration of the speedometer and the odometer, it is necessary that the vehicle be at rest. If the vehicle were moving during calibration, it should be appreciated, the actual doppler effect of the moving vehicle relative to the ground will be added to the pseudo-doppler signals that are generated by the calibrating apparatus and techniques described above.

The embodiment of the invention has been described in terms of a vehicle carrying a speedometer and odometer for purposes of measuring its own speed and distance covered. However, by directing the antenna 12 to a horizontal plane such as to provide probe radar signals in a forward direction ahead of the vehicle, means is provided for determining the speed of remote moving vehicles relative to the vehicle carrying the radar. It will be further appreciated that the invention is not limited to vehicles such as had been described but may be used also with locomotives, marine vessels and airborne equipment such as helicopters.

It should be appreciated from the foregoing description of the preferred embodiment that the present invention provides for a particularly advantageous method of calibrating doppler radar sensors. This is achieved by a calibration signal derived by a variable impedance device modulating a radar signal for sustained periods ample for accurate calibration. In addition, the variable impedance device is easily positioned in the near field of the radar antenna. Moreover, the method of the present invention serves as a complete operational check of the radar sensor in that all component circuits of the system must function properly for a calibration reading to be obtained.

It will be understood that the above description is of an illustrative embodiment of the present invention, and that the invention is not limited to the specific form shown. Modification may be made in the design and arrangement of the elements without departing from the spirit of the invention as will be apparent to those skilled in the art.

What is claimed is:

1. A method for calibrating a doppler radar sensor having an indicator coupled to the doppler signal output of said radar sensor for providing indicia manifesting doppler signal outputs comprising the steps of:
   modulating a radar probe signal from said radar sensor with a modulating signal having a predetermined frequency corresponding to a predetermined doppler signal output by positioning a varying impedance in the near-field of said radar probe;
   deriving a doppler signal output from said modulated radar probe, said doppler signal having a frequency equal to said predetermined modulating frequency, and
   adjusting the doppler signal output of said radar sensor to provide an indication corresponding to said predetermined doppler signal output.

2. A method according to claim 1, wherein said indicator is a speed indicator including a d.c. meter and further comprising the step of averaging said doppler signal output prior to said adjusting step.

3. A method according to claim 1, wherein said indicator is an odometer, further comprising the steps of:
   a. counting a predetermined number of cycles of said predetermined frequency, said predetermined number of cycles corresponding to a predetermined distance;
   b. modulating said probe signal with said modulating signal only for a period defined by said predetermined number of cycles; and
   c. adjusting said doppler signal by modifying the number of cycles of said doppler signal to provide an indication of said odometer corresponding to said predetermined distance.

4. A system for calibrating a doppler radar sensor comprising in combination:
   a doppler radar for providing radar signals, an antenna for transmitting a beam of said signals in a given direction and receiving reflected signals of said signals, said radar having means for generating an output signal manifesting doppler effects of said signals,
   an indicator, responsive to the output signal of said radar, for indicating said doppler effects,
   means for adjusting said indicator to a desired calibrated indication in response to said output signal,
   a variable impedance device positioned in the near-field of said antenna, and
   means for applying an alternating current signal at a selected frequency across said device to vary the impedance of said device,
   whereby, in response to said alternating current signals, said variable impedance modulates said radar signals providing thereby an output signal from said radar for energizing said indicator to manifest an indication proportional to the frequency of said alternating current,
   said indicator adjustment means being adjusted to calibrate said indicator to a desired indication corresponding to the doppler effect.

5. A system according to claim 4 wherein said variable impedance is a varactor.

6. A system according to claim 4 wherein said variable impedance is a PN diode.

7. A system according to claim 4 wherein said antenna is a corporate feed array of antennae formed on a substrate, said variable impedance device being affixed to said substrate.

8. A system according to claim 4 wherein said antenna is a horn antenna.

9. A system according to claim 4 wherein said indicator is a speed indicator including a d.c. meter; further comprising:
   averaging means, connected between said radar sensor and said indicator, for providing to said indicator a d.c. signal having a voltage level indicative of the frequency of said radar output signal, and a variable resistance device, coupled between said averaging means and said meter, for adjusting said meter to said desired indication.

10. A system according to claim 4, wherein said indicator is an odometer including a means for registering the number of cycles of said radar output signal received at said indicator, said system further including means, responsive to said alternating current signals, for applying said alternating current signal to said variable impedance only for a period defined by a predetermined number of cycles; and wherein said adjustment means comprises an adjustable counter, connected between said radar and said odometer, for modifying the number of cycles of said radar output signal registered by said odometer to provide an indication on said odometer corresponding to said predetermined number of cycles.

11. A method of calibrating a doppler radar sensor, said sensor including a signal source for generating a signal at a predetermined frequency, an antenna network for transmitting a beam of said signal in a given direction and receiving reflected signals of said transmitted signal, subtraction means, receptive of a local oscillator signal and said reflected signal, for generating an output signal indicative of the frequency shift between said transmitted and reflected signals, and indicator means, receptive of said output signal, for indicating in accordance with said output signal, said indicator means including adjustment means for adjusting said indicator means to a corresponding indication for a given value of said output signal; the steps comprising:

a. applying a calibration signal of a given frequency across a variable impedance device to vary thereby the impedance of said device;

b. positioning said device in the near field of said antenna,
 said varying impedance of said device generating a modulated reflection to said sensor,
 said modulation being in accordance with said given frequency, thereby causing said sensor to generate an output signal to said indicator means in accordance with said given frequency;

c. adjusting said indicator means to an indication corresponding to said given frequency.

12. The method of claim 11 wherein said variable impedance device varies in capacitance in accordance with the amplitude of said calibration signal.

13. The method of claim 12 wherein said device is a varactor diode.

14. The method of claim 11 is a PN diode, wherein the resistance of said diode varies at a frequency substantially equal to the frequency of said calibration signal.

* * * * *